United States Patent [19]

Mies et al.

[11] Patent Number: 5,662,390

[45] Date of Patent: Sep. 2, 1997

[54] METHOD AND APPLIANCE FOR CONTROLLING A POWER-BRAKE VALVE

[75] Inventors: Hubert Mies, Partenstein; Werner Gitter, Neuendorf, both of Germany; Sture Lindblom; Bo Karlsson, both of Eskilstuna, Sweden

[73] Assignee: Mannesmann Rexroth GmbH, Lohr/Main, Germany

[21] Appl. No.: 46,273

[22] Filed: Apr. 9, 1993

[30]     Foreign Application Priority Data

Apr. 9, 1992 [DE] Germany ............... 42 12 032.2

[51] Int. Cl.$^6$ ............................................. B60T 13/16
[52] U.S. Cl. .................. 303/10; 303/52; 303/59; 303/86; 303/9.01
[58] Field of Search ................. 303/10, 50, 52, 303/56, 54, 59, 66, 86, 9.61, 116.1, 116.2, 115.4; 188/352

[56]     References Cited

U.S. PATENT DOCUMENTS

| 4,640,558 | 2/1987 | Nomura et al. ............ 303/116.1 |
| 4,775,196 | 10/1988 | Braschel et al. ............ 303/115.4 |
| 5,004,301 | 4/1991 | Yamada et al. ............ 303/115.4 |

FOREIGN PATENT DOCUMENTS 37 39 298  6/1989  Germany.

*Primary Examiner*—Lee W. Young
*Attorney, Agent, or Firm*—Hazel & Thomas, P.C.

[57]     ABSTRACT

In a power-brake system, a hydraulic pressure generated by means of a pump may be supplied, controllably in proportion to an actuation force via brake conduits, by a power-brake valve to individual brake cylinders. Control pressure conduits are connected to the brake cylinders or the brake conduits in the vicinity of the brake cylinders and these control pressure conduits are connected to the brake valve. The brake pressure at the brake cylinders may be fed back, via the control pressure conduits, as the control pressure for acting on the control end of the brake valve so that a control of the control plungers of the brake valve is carried out corresponding to the brake pressure build-up at the brake cylinders and, particularly when low brake pressures are desired, rapid pressure build-up times in the brake conduits are ensured. In addition, throttles may be provided in the control pressure holes in the brake valve so that the damping and closed-loop control behavior of the brake valve are positively affected. In addition, the brake conduits may be flushed from the direction of the brake cylinders by means of an auxiliary pump.

10 Claims, 10 Drawing Sheets

5,662,390

1

METHOD AND APPLIANCE FOR CONTROLLING A POWER-BRAKE VALVE

BACKGROUND OF THE INVENTION

1. Field of the Invention

The invention relates to a brake valve for motor vehicles and, in particular, relates to a control circuit or a brake valve pressure feedback circuit for regulating the pressure in a plurality of brake cylinders.

Such brake valves are, for example, employed in motor vehicles within single-circuit or twin-circuit power-brake systems in order to ensure a sensitive build-up and reduction of the brake pressures present at the motor vehicle brake cylinders on actuation of the valve. These brake valves are preferably fastened in this case to the floor panel of the motor vehicle so that they may be conveniently and directly actuated by means of a pedal connected to the brake valve.

2. Description of the Prior Art

Known brake valves of this generic type, with the principle of their connection and examples of hydraulic switching arrangements using these brake valves, are represented as examples in FIG. 5 through FIG. 9.

The known brake valves 10 shown in FIG. 5(A) and 5(B), in single-circuit embodiment in FIG. 5(A) and twin-circuit embodiment in FIG. 5(B), are directly controlled pressure reducing valves of three-way embodiment with brake circuit pressure protection and stepless mechanical actuation, i.e., with the pressure in the brake circuit steplessly adjustable in proportion to the given actuation force.

These valves 10 are acted on by a hydraulic pressure via passages $S_P$ from brake system hydraulic reservoirs 30 and a pump (not represented), and are connected, via passages $B_R$ to brake conduits 12. Brake conduits 12 lead to the brake cylinders 20 of the motor vehicle and are connected to a receiver or tank 40 via passages T. Furthermore, the brake pressure is fed back within valve 10, with or without throttling, via a control pressure hole or conduit Z for the closed-loop control of valve 10.

As an example for both brake valve embodiments, the mode of operation is described below using single-circuit embodiment of FIG. 5(A).

The brake valves 10 are respectively actuated by means of an actuation element 16, such as a pedal. This actuation element 16 presses a main compression spring 17A against a control plunger 13 of valve 10. A control edge (not represented) of the control plunger 13 closes passage T and the through-flow from passage $S_P$ to passage $B_R$ is then released. The pressure which now builds up in brake conduit 12 also acts simultaneously, via the control fluid hole Z, in valve 10 behind control plunger 13 and acts against main compression spring 17A so that the brake pressure increases in proportion to the actuation force on spring 17A. If the actuation force is kept constant, control plunger 13 goes into the closed-loop control position and therefore keeps the adjusted value in passage $B_R$, substantially constant until there are control deviations. If main compression spring 17A is relieved, a compression spring 17C closes the passage between $S_P$ and $B_R$ and opens the passage between $B_R$ and T by means of control plunger 13 so that the brake circuit is relieved.

The mode of operation of the twin-circuit embodiment of the valve 10 in FIG. 5(B) is given, in principle, by the parallel connection to the pump of two single-circuit embodiments, control plungers 13 being connected in series relative to one another by springs 17A, 17B, and 17C.

2

Furthermore, a distance piece or stop piece 17D is arranged between control plungers 13. On actuation of actuation element 16, the actuation force is transmitted to second control plunger 13.2, via first control plunger 13.1, by means of distance or stop piece 17D. In the closed-loop control position of control plungers 13.1 and 13.2, these plungers are elastically loaded relative to one another by means of a spring 17B fitted between them so that a relative motion between two control plungers 13.1 and 13.2 for individual adjustment of the pressure in the respective brake circuit is made possible. At control fluid holes Z, connected to the respective brake circuits in valve 10, main compression spring 17A and spring 17B connected between plungers 13.1 and 13.2 act against each other, oppositely in this case also, so that the brake pressure increases in proportion to the actuation force. These control fluid holes Z may have a throttle or orifice 18 in valve 10. Furthermore, control fluid hole Z, located in the brake valve 10, for first control plunger 13.1 located nearest to actuation element 16 and may be additionally connected from actuation direction to one control end of second control plunger 13.2. This ensures that both brake circuits have approximately the same pressure level by means of follow-up control.

FIGS. 6 and 7 show typical circuit configurations of brake valves 10 of the generic type, a single-circuit power-brake system being represented in FIG. 6 and twin-circuit power-brake system being in FIG. 7, with a handbrake 70 in each case. In these circuits, power-brake valve 10 acts directly, in a known manner, on wheel brake cylinders 20 via brake conduits 12. Additionally, the brake pressure being measured in valve 10 and control plunger 13 of valve 10 is adjusted in proportion to the measured pressure or control pressure.

In the power-brake valves of the generic type, it has been found that the buildup times for brake pressure in brake conduits 12 are very long, particularly in the case of long brake conduits 12. This becomes noticeable, particularly when low brake pressures are desired. This is because the pressure build-up occurs more slowly at a lower pressure value that at a high pressure value. In addition, the response or feel of the brake for the person actuating the brake is greatly impaired in these cases. This increases the danger of over-braking.

In order to obviate these disadvantages, a hydraulic brake system has therefore been proposed such as is realized, for example, in the brake systems of FIGS. 8 and 9.

FIGS. 8 and 9 represent power-brake systems of twin-circuit configuration with an additional third handbrake circuit 70. These brake systems are employed in very large motor vehicles, for example, heavy transport vehicles, where the lengths of the brake conduits assume substantial lengths. For this reason, relay valves 80 with hydraulic reservoirs 30 are provided directly at each brake axle in these known brake systems. The supply to these brake systems is ensured by a pump P and a plurality of hydraulic reservoirs 30 which respectively act with hydraulic pressure on relay valve 80 of the first or second brake circuit. A twin-circuit power-brake valve 10 of the generic type is, in addition, intermediately connected in the secondary circuit (control circuit) of the relay valves 80 so that it may only be used for triggering relay valves 80. This arrangement ensures short response times for the brakes even in the case of long brake conduits.

Specific disadvantages of the brake systems of this type are, however, the high level of structural complexity, the high weight and the sppace requirements necessary; these are mainly due to the need for hydraulic reservoirs at the axle. In addition, such power-brake systems with relay valves 80 are very cost-intensive due to the number of additional components required and for the reasons quoted above.

SUMMARY OF THE INVENTION

The invention is based on the object of further developing power-brake valves of the generic type in such a way that a more rapid build-up of pressure is ensured in the brake conduits, particularly when low brake pressures are desired, and that the response or feel of the brake is improved for the person actuating the brake.

This object is achieved by means of a power-brake valve in a power brake system which regulates brake pressure in a plurality of brake cylinders. The powerbrake comprises at least one control plunger, which is preloaded in a neutral position and connects one brake cylinder to a receiver; the control plunger has a control end of which may be acted on by an actuation force in such a way that the control plunger may be brought into a switching position for pressure action via a brake conduit on the brake cylinder; and a control pressure for closed-loop adjustment of the brake pressure, the control pressure adjusting itself according to the build-up of the brake pressure in the brake cylinder; and the power-brake valve being connected to at least one external control pressure conduit for pressure action on the control plunger, which control pressure conduit is acted on by the respective brake pressure instantaneously prevailing in the brake cylinder.

The invention therefore provides for feeding back the brake pressure corresponding to the pressure in the brake cylinders to control the control plunger of the power-brake valve. For this purpose, at least one control pressure conduit is provided which is connected to the power-brake valve and is acted on by the instantaneous brake pressure in the respective brake cylinder. By this means, the opening position of the control plunger of the power-brake valve is regulated by the instantaneous pressure relationships at the brake cylinder. Relative to the state of the art, this arrangement achieves substantially more rapid pressure build-up times, particularly in the case of low pressures, high viscosities of the hydraulic fluid or small conduit diameters, because the opening position of the valve corresponds to the actual pressure in the brake cylinders and is not reset too rapidly, as in the state of the art. In the case of a high brake pressure as the control pressure which, in accordance with the state of the art, has the result that excessively small opening cross-sections of the control plunger are adjusted in closed-loop for the actual pressure build-up at the brake cylinder and the danger of over-braking exists. The person actuating the power-brake valve has therefore, in accordance with the invention, a good response or feel from the brakes because the control plungers are adjusted in closed-loop by the actual pressure at the brake cylinders and the desired braking effect is adjusted substantially without time delay or with only a very small time delay when the actuation displacement or actuation force is specified.

An advantageous further development of the subject matter of the invention provides for a control pressure hold inside the power-brake valve. Together with the pressure measuring surface of the control plunger, this forms a vibration damper which, in the case of dynamic control of the valve, improves the closed-loop control behavior of the valve by damping, in addition to the improved opening characteristic of the valve according to the invention.

The invention provides for connecting the control pressure hole to the brake pressure passage of the power-brake valve. The closed-loop control behavior of the valve is improved in an advantageous manner by this arrangement because the control plungers of the valve have already been acted on by the measured or control pressures at an earlier stage during the pressure build-up in the brake conduits.

Additionally, a further throttle in the connection between the control pressure hold and the brake pressure passage of the power-brake valve may be provided. By this means, the intermediate pressures, and therefore the control pressures in the valve, may be adjusted to a defined manner by the choice of throttles. Thus, opening characteristic and the damping of the valve may be affected in such a way that the valve may be optimized with respect to cut-off and overshoot behavior.

In an advantageous further development, the brake conduits of the power-brake system are additionally acted on by an auxiliary pump with a flushing flow from the direction of the brake cylinders, by which means the hydraulic fluid in the brake conduits may be hydraulically preloaded, given an appropriate embodiment of the control plungers of the power-brake valve, which has the result that the pressure build-up times are still further reduced. In the case of control plungers of the brake valve located in the neutral or initial position, the brake conduits are flushed so that, on the one hand, the brake conduits may be heated by flushing with warm hydraulic fluid so that the pressure build-up times in the brake conduits are shortened because of the reduced viscosity of the fluid and, on the other hand, the brakes are effectively cooled after the braking procedure.

If the hydraulic fluid in the receiver is heated and, by this means, the flushed brake conduits are advantageously kept at a constant temperature, the conduit resistances of the brake conduits may be minimized for even shorter pressure build-up times because the viscosity of the fluid may be adjusted in a defined manner by means of its temperature to a favorable operating point.

Other objects and features of the present invention will be apparent from the following detailed description of the preferred embodiment.

BRIEF DESCRIPTION OF THE DRAWINGS

The invention will be further described in conjunction with the accompanying drawings, in which.

DETAILED DESCRIPTION OF PREFERRED EMBODIMENTS

Figure 1:
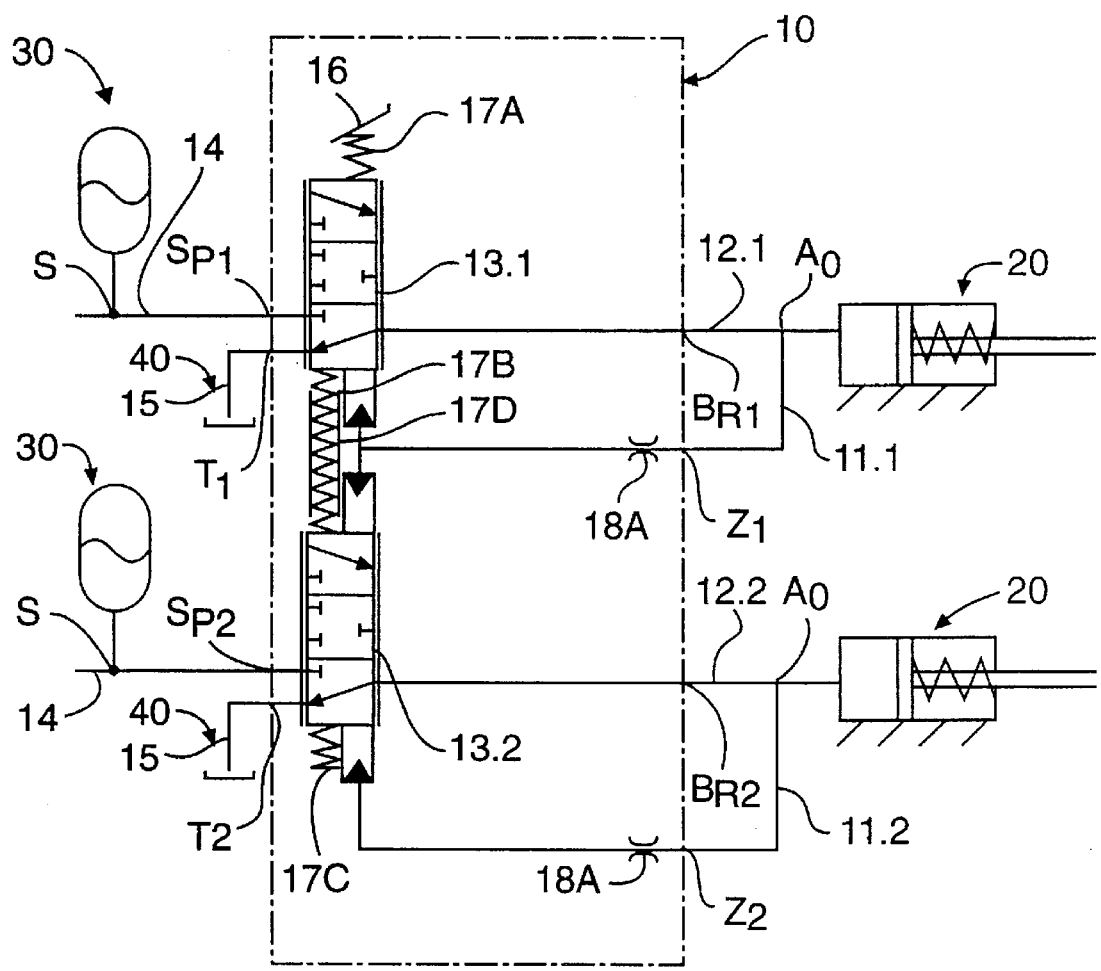
FIG. 1 shows a first exemplary embodiment of a brake valve according to the invention with brake pressure feedback in a twin-circuit system.

The first embodiment example of the power-brake valve 10 according to the invention in twin-circuit embodiment, represented in FIG. 1, shows control pressure conduits 11.1 and 11.2 of valve 10, whose respective first ends are connected at points $A_O$ outside valve 10 to brake conduits 12 in the mediate vicinity of brake cylinders 20, known per se, for a brake pressure feedback. The respective second end of control pressure conduits 11.1 and 11.2 are connected to a control pressure connection $Z_1$ and $Z_2$, respectively, of valve 10 so that two valve plungers or control plungers 13.1 and 13.2 of valve 10, connected in parallel to a pump (not represented) may be acted on by a control pressure of brake cylinders 20, as described below.

In FIG. 1, power-brake valve 10 is connected by means of two passages $S_{P1}$ and $S_{P2}$ to two supply conduits 14 by means of which brake valve 10 may be acted on by a hydraulic pressure from the hydraulic reservoirs 30 and the pump. Hydraulic reservoirs 30 are connected to supply conduits 14 at points S. Two passages $T_1$ and $T_2$ of valve 10 are connected via supply conduits 15 to a respective tank or receiver 40. In addition, two passages $B_{R1}$ and $B_{R2}$ of brake valve 10 are respectively connected to one end of brake conduits 12.1 and 12.2, at whose other end are located the brake cylinders 20, known per se. Overall, therefore, the passages $B_{R1}$ and $T_1$ and the passages $S_{P2}$, $B_{R2}$ and $T_2$, together with the components connected to them, form a first brake circuit and a second brake circuit.

The construction of power-brake valve 10, which is configured as a directly controlled 3-position/3-way pressure reducing valve, is described below, the chain-dotted line describing the system boundary of power-brake valve 10.

In order to adjust the brake pressure in the two brake circuits in proportion to the actuation force, the force may be introduced into the brake valve 10 by means of an actuation element 16, such as a pedal. A main spring 17A, which transmits the actuation force to control plunger 13.1 of the first brake circuit, is connected to the actuation element 16. In order to limit the maximum brake pressure, spring deplacement of main spring 17A is mechanically limited by, for example, stops (not represented). First control plunger 13.1 is elastically connected to control plunger 13.2 of the second brake circuit by means of an intermediate spring 17B and, furthermore, a distance piece or stop piece 17D is provided between control plungers 13.1 and 13.2. This stop piece 17D may, for example, also be configured in the design by stops (not represented) formed on control plunger 13 or by stop pins (not represented) attached to it. Second control plunger 13.2 is supported elastically relative to a valve housing (not represented) of brake valve 10 by a further reset or control spring 17C. Springs 17A, 17B, 17C may, for example, be compression springs.

In addition, control pressure conduit 11.1 of valve 10 is connected to brake conduit 12.1 which is connected to control pressure holes or conduits Z which lead to control plunger 13.1 of valve 10 in such a way that the end of control plunger 13.1 is opposite to main spring 17A and may be acted on by a control pressure against the force of the main spring 17A. Second control plunger 13.2 may be acted on by a control pressure at intermediate spring 17B end against the force of third spring 17C. Control pressure conduit 11.2 is connected to brake conduit 12.2, of the second brake circuit of valve 10, to a control pressure hold or conduit $Z_2$ leading to second control plunger 13.2 so that second control plunger 13.2 may be acted on by a control pressure against the direction of the actuation force.

Control plungers 13.1, 13.2 are preloaded in a neutral or initial position by springs 17A, 17B, 17C in such a way that the first control plunger 13.1 connects passage $B_{R1}$ to the passage $T_1$ and second control plunger 13.2 connects passage $B_{R2}$ to the passage $T_2$ so that the respective brake cylinders 20 are connected to each respective tank 40 and, therefore, the brake circuits are relieved. On actuation of brake valve 10, the fluid connection between passages $B_{R1}$ and $T_1$ and between $B_{R2}$ and $T_2$ are respectively interrupted in a central switching position of valve 10 so that the pressure relationships at valve 10 remains unaltered. In an end switching position of valve 10, control plungers 13.1, 13.2 connect passages $S_{P1}$, $S_{P2}$ and $B_{R1}$, $B_{R2}$ so that brake cylinders 20 are acted on by hydraulic pressure from respective hydraulic reservoirs 30 or pump.

A throttle or orifice 18A is arranged in valve 10 in each of control pressure holes $Z_1$, $Z_2$ of the first and second brake circuits. These throttles 18A respectively form, together with the pressure surface or pressure measuring surface of first and second control plungers 13.1, 13.2, a vibration damper which supplies substantial additional damping proportion or factor in addition to the vibration damping caused by friction and hydrodynamic forces. It is therefore a peculiarity of the damper embodiment designed in this way that the damping proportion or the damping factor tends to zero when the speed of control plungers 13.1 and 13.2 tends to zero, i.e. minimum speed of the control plungers 13.1 and 13.2 is necessary for the generation of a sufficient damping force.

The mode of operation of the first embodiment example of the invention is described below.

If actuation element 16 of brake valve 10 is actuated, first control plunger 13.1 is displaced in the actuation direction by means of main spring 17A. The spring displacement of main compression spring 17A is mechanically limited to adjust the maximum brake pressure. Simultaneously, first control plunger 13.1 presses via intermediate spring 17B or, after a defined deformation of spring 17B, via stop piece 17D on second control plunger 13.2 and displaces the latter likewise in the actuation direction against the force of third reset or control spring 17C. Substantially at the same time, control edges (not represented) of first and second control plunger 13.1, 13.2 respectively close the connection between passages $B_{R1}$ and $B_{R2}$, respectively, is then released so that a pressure builds up in brake conduits 12. This pressure is measured at external positions of brake conduits 12, i.e., outside brake valve 10 on brake conduits 12 at respective brake cylinder 20 or directly on brake cylinder 20, and is fed back into valve 10 via control pressure conduits 11.1 and 11.2. In valve 10, the measured brake cylinder pressure of the first brake circuit then acts, together with the spring force of intermediate spring 17B, behind first control plunger 13.1 against the spring force of main spring 17A and, together with the spring force of intermediate spring 17B, in front of second control plunger 13.2 against the spring force of third spring 17C. In addition, the pressure tapped at brake cylinder 20 of the second brake circuit and fed back into valve 10 via second control pressure conduit 11.2 acts behind second control plunger 13.2 in the direction opposite to the actuation force so that control plungers 13.2 adjust opening areas corresponding to the measured pressure as a function of the given spring stiffness of the control springs 17A, 17B, 17C. Overall, therefore, the pressure in brake conduits 12 increases in proportion to the actuation force. If the actuation force is kept constant, with the actuation element 16 not displaced any further from the instantaneous actuation position, control plungers 13.1 and 13.2 move into their closed-loop control position and keep the pressure value adjusted in the passages $B_{R1}$ and $B_{R2}$ substantially constant until there are control deviations. If main compression spring 17A is then relieved, because brake valve 10 is no longer actuated, third spring 17C and intermediate spring 17B interrupt the connection between passages $S_{P1}$ and $B_{R1}$ and between $S_{P2}$ and $B_{R2}$ and open the connection between passages $B_{R1}$ and $T_1$ and between $B_{R2}$ and $T_2$ by displacing control plungers 13.1, 13.2.

The opening height and therefore the opening area, which the control plungers 13.1 and 13.2 open to fill brake cylinders 20, therefore substantially depend on the desired brake pressure, the measured or control pressures, the maximum opening position adjusted by means of the limited spring displacement of main spring 17A and a stop limiting the maximum opening position in the valve. In the case of dynamic control of the brake pressures to fill brake cylinders 20, the measured pressures fed back into valve 10 correspond to the brake pressures in brake cylinders 20. In contrast to the state of the art—where, due to the control pressure measurement in the valve, the control plungers of the valves open an opening area which is too small or closed-loop control an opening stroke which is too small— an opening position of the control plungers is closed-loop controlled corresponding to the brake pressure in the brake cylinders. The pressure differences between the brake pressures in the passages $B_{R1}$ and $B_{R2}$ and the brake pressures directly at the brake cylinders, which are caused by the conduit resistance of the brake conduits and which are a function of the cross-section and length of the brake conduits and the viscosity of the hydraulic fluid, do not therefore affect the dynamic opening characteristic of the brake valve so that a no reduction of the pressure build-up times in the brake conduits is achieved, particularly when the desired brake pressures are low.

Figure 2:
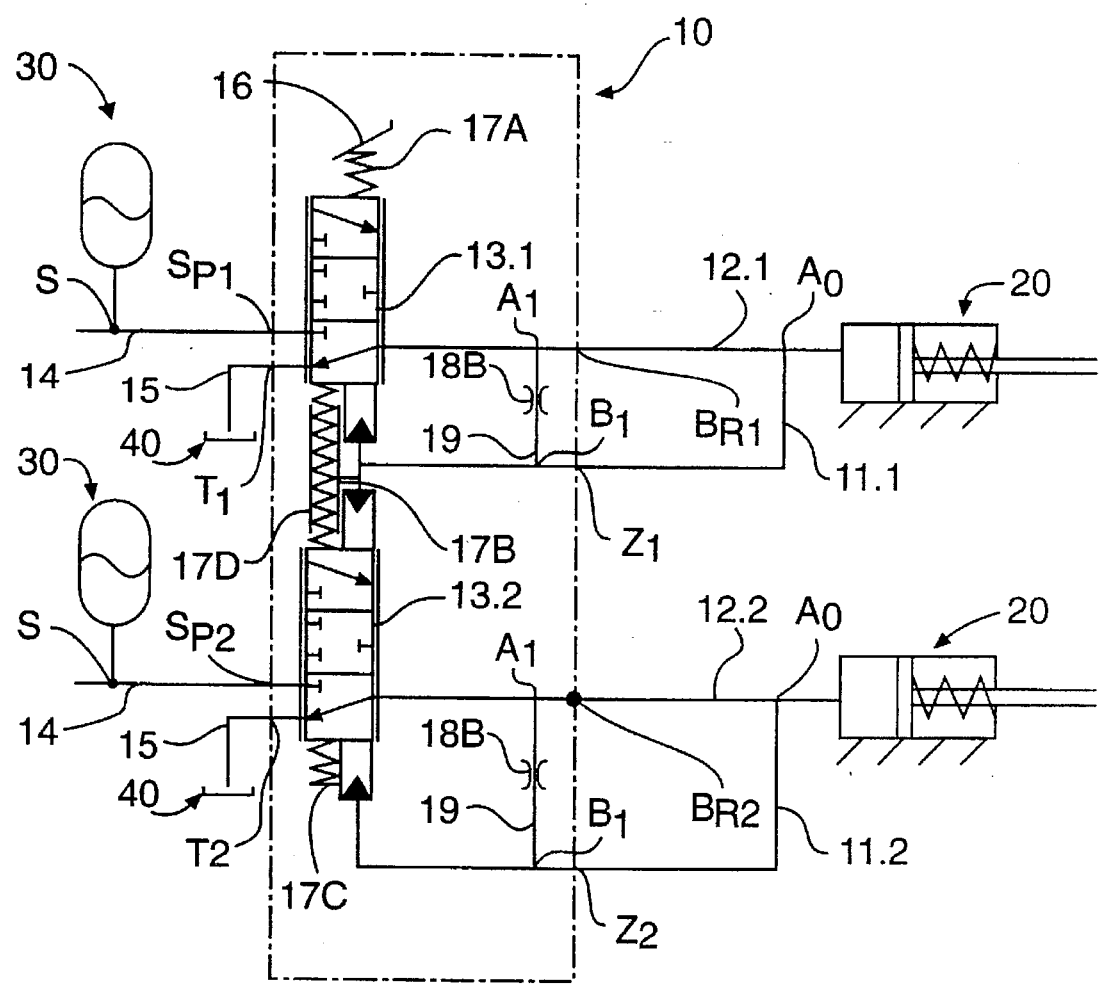
FIG. 2 shows a second exemplary embodiment of the brake valve with brake pressure feedback in a twin-circuit configuration.

FIG. 2 shows a second embodiment example of the invention, which represents the principle of the first embodiment example described above applied to a known brake valve.

In addition to the construction of the first embodiment example of the invention represented in FIG. 1, a connection 19 is provided in FIG. 2 between points $B_1$ of the respective control pressure holes $Z_1$ and $Z_2$ and the Points $A_1$ of each passage $B_{R1}$ and $B_{R2}$ in valve 10. A throttle or orifice 18B provided for damping valve 10 is arranged in each of these connecting conduits or holes 19 so that one throttle 18B is connected per control circuit in valve 10. The rest of the construction of the second embodiment example corresponds to the construction, described above, of the first embodiment example in FIG. 1 and does not therefore need to be described again at this point.

The mode of operation of the second embodiment example corresponds, in principle, to that of the first embodiment example, the additional feedback of the control pressure in valve 10 ensuring that control plungers 13.1 and 13.2 are already acted on by the measured or control pressures at an early stage during the pressure build-up in the brake conduits 12.1 and 12.2. This measure improves the closed-loop control behavior of brake valve 10 according to the invention because valve 10 reacts more rapidly to pressure build-up in the brake conduits 12.1 and 12.2.

Figure 3:
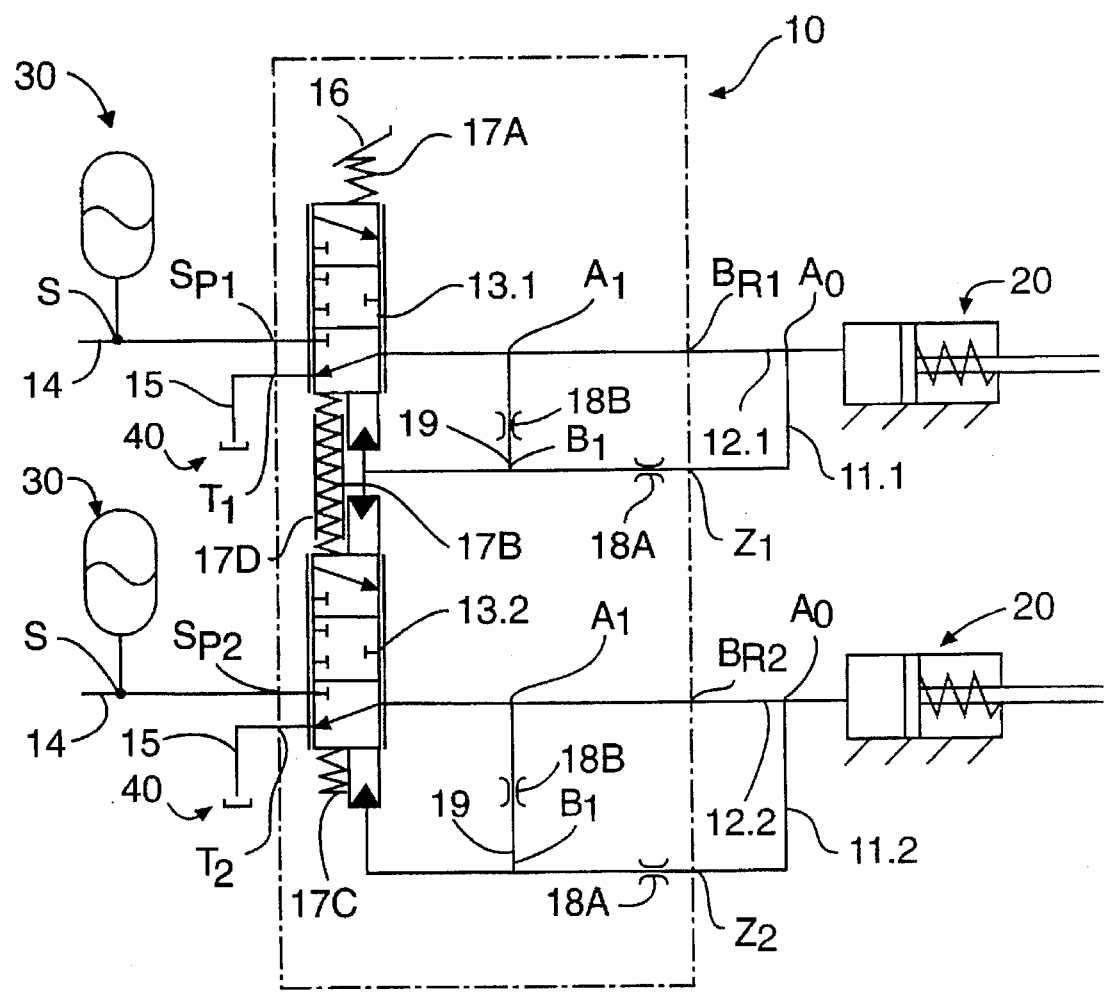
FIG. 3 shows a third exemplary embodiment of the brake valve with brake pressure feedback in a twin-circuit configuration.

FIG. 3 shows a third embodiment example of the invention which arises, in principle, from the combination of the first and second embodiment examples and which represents a second further development of the first embodiment example in FIG. 1.

The construction of the third embodiment example corresponds to the construction of the second embodiment example described above and shown in FIG. 2, a second throttle or orifice 18A being connected per control circuit in the control circuits of valve 10 between points $A_0$ and $A_1$ (from the direction of brake cylinders 20) before the internal brake pressure feedback in the valve 10. During the filling procedure of brake cylinders 20, therefore, the pressure drop in brake conduits 12.1 and 12.2 may be adjusted, for example divided, in the control circuits to suit the requirements, and—added to the brake cylinder pressure—it may be supplied to the measuring surfaces of control plungers 13.1 and 13.2.

If flow takes place through orifices 18A or 18B during the filling of the brake cylinders 20, i.e., in the case of a large hydraulic fluid flow or flux, brake valve 10 according to FIG. 3 is clamped more strongly relative to the first embodiment example given a suitable choice of the ratios of the orifices cross-section to the control plunger pressure surface. The flow capacity of brake valve 10 may be increased by this means, whilst the advantageously rapid response behavior of brake valve 10 due to the internal brake pressure feedback 19 in accordance with the second embodiment of the invention is also ensured. In addition, suitable choice of the orifice combination permits defined matching of the closed-loop control behavior of valve 10 by adjustment of the intermediate pressures at throttles 18A or 18B. The measured pressure may therefore be adjusted in a defined manner relative to the brake cylinder pressure.

In accordance with the third embodiment of the invention, the opening characteristic, in particular the cut-off point of valve 10, and also the damping, particularly the overshoot behavior of valve 10, is positively affected overall. The advantages of the third embodiment example corresponding to FIG. 3 are particularly large when low brake pressures have to be attempted because in this case control plungers 13.1 and 13.2 only open relatively small cross-sections because of control springs 17A, 17B, 17C. In this case, substantially more rapid response times may be achieved relative to power-brake valves of the generic type. In practice, the flow through brake valve 10 is limited to a maximum value in order to permit sensitive control of the brake pressure without back kick at pedal 16 and without over-reaction of the brakes.

Figure 4:
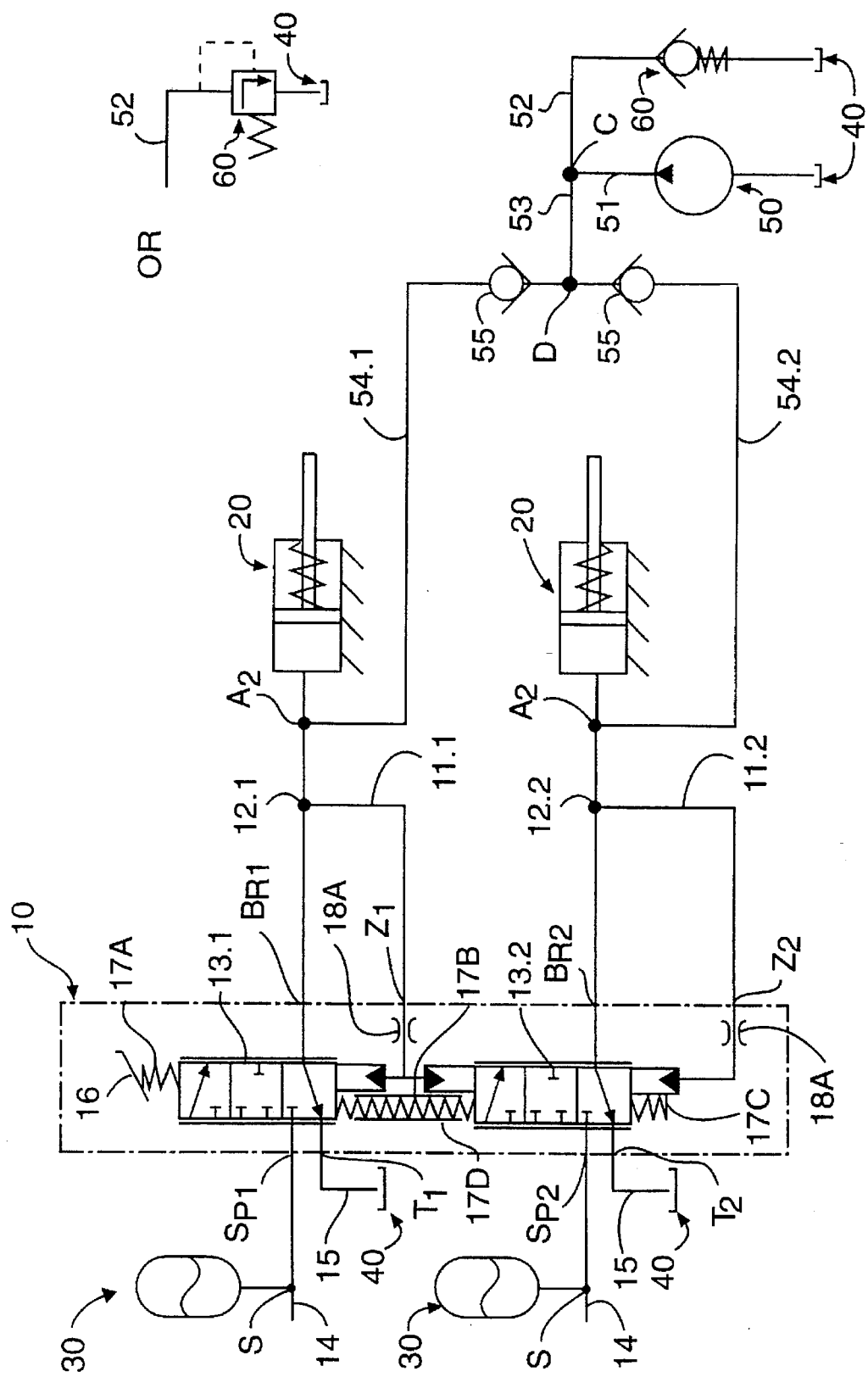
FIG. 4 shows a fourth exemplary embodiment of the brake valve in a twin-circuit embodiment with an auxiliary pump additionally connected to the brake conduits.
Figure 5A:
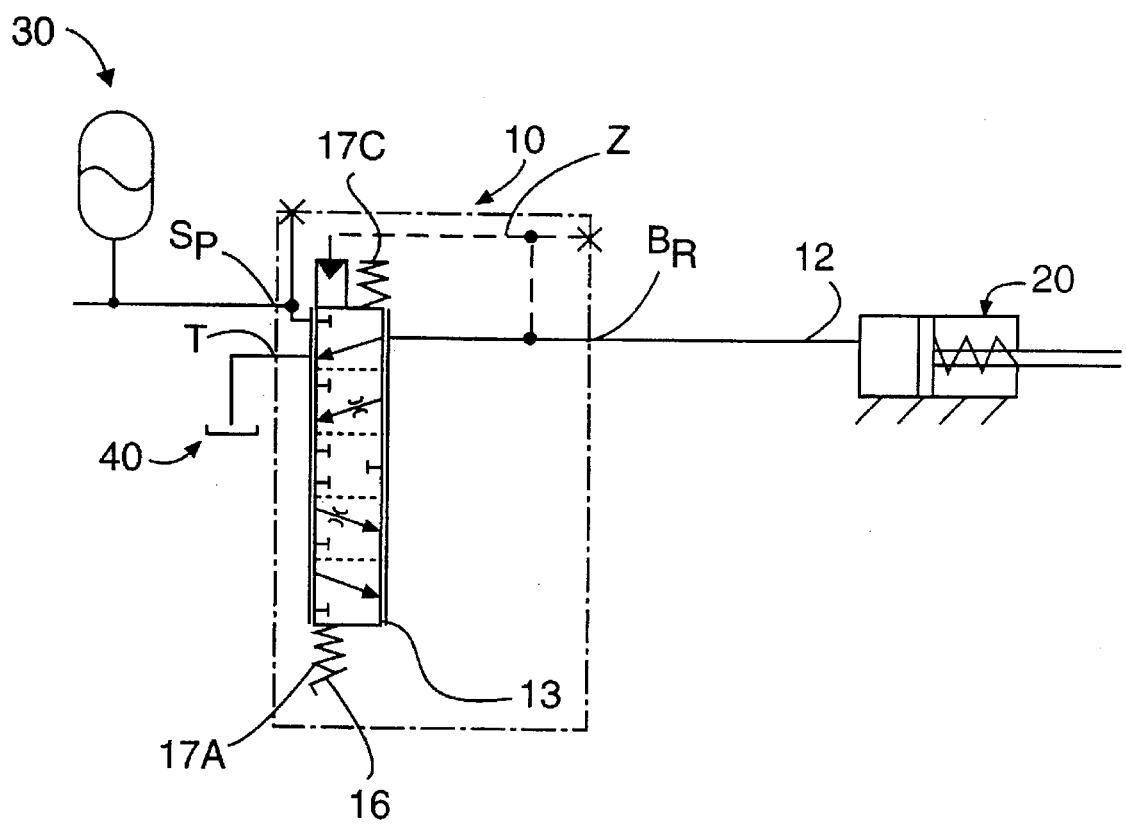
FIG. 5(A) shows a known power-brake valve in single-circuit embodiment with a circuit arrangement shown in principle.
Figure 5:
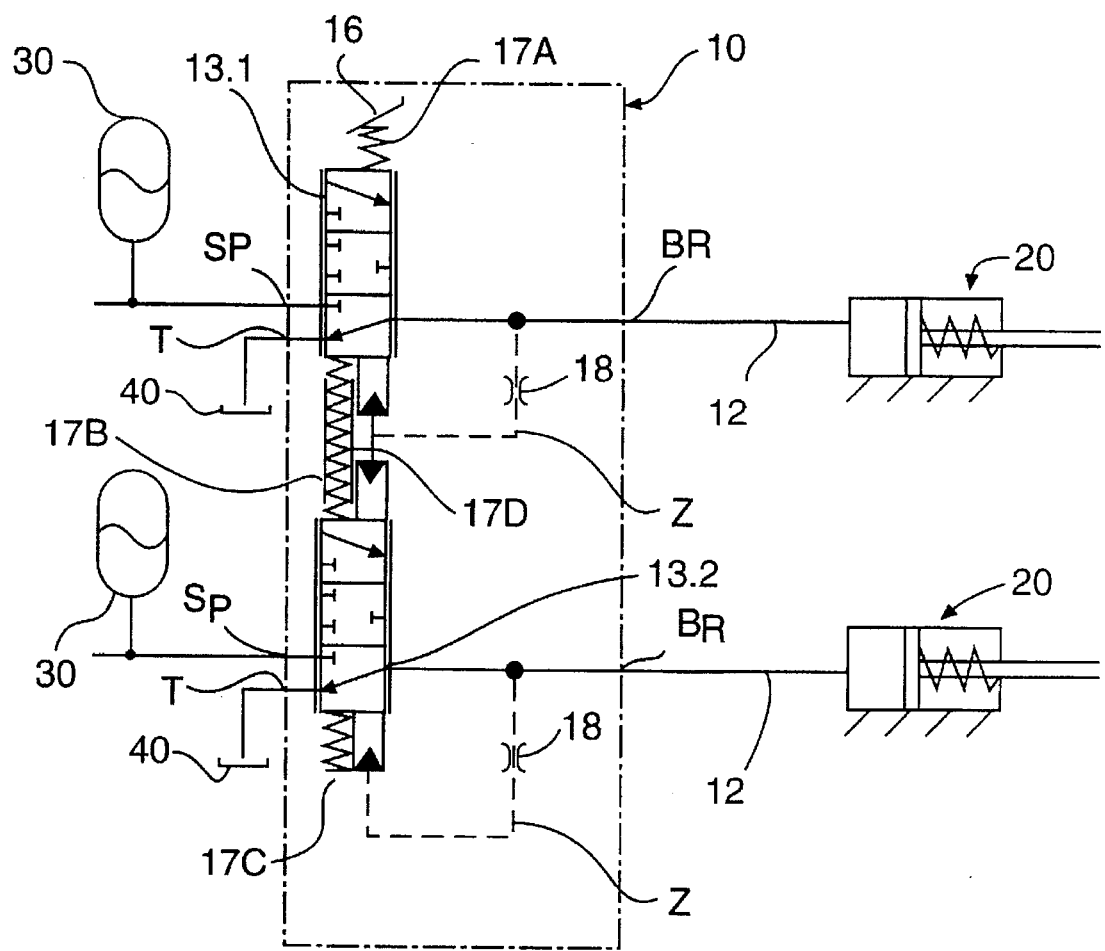
FIG. 5(B) shows a know power-brake valve in twin-circuit embodiment with a circuit arrangement shown in principle.
Figure 6:
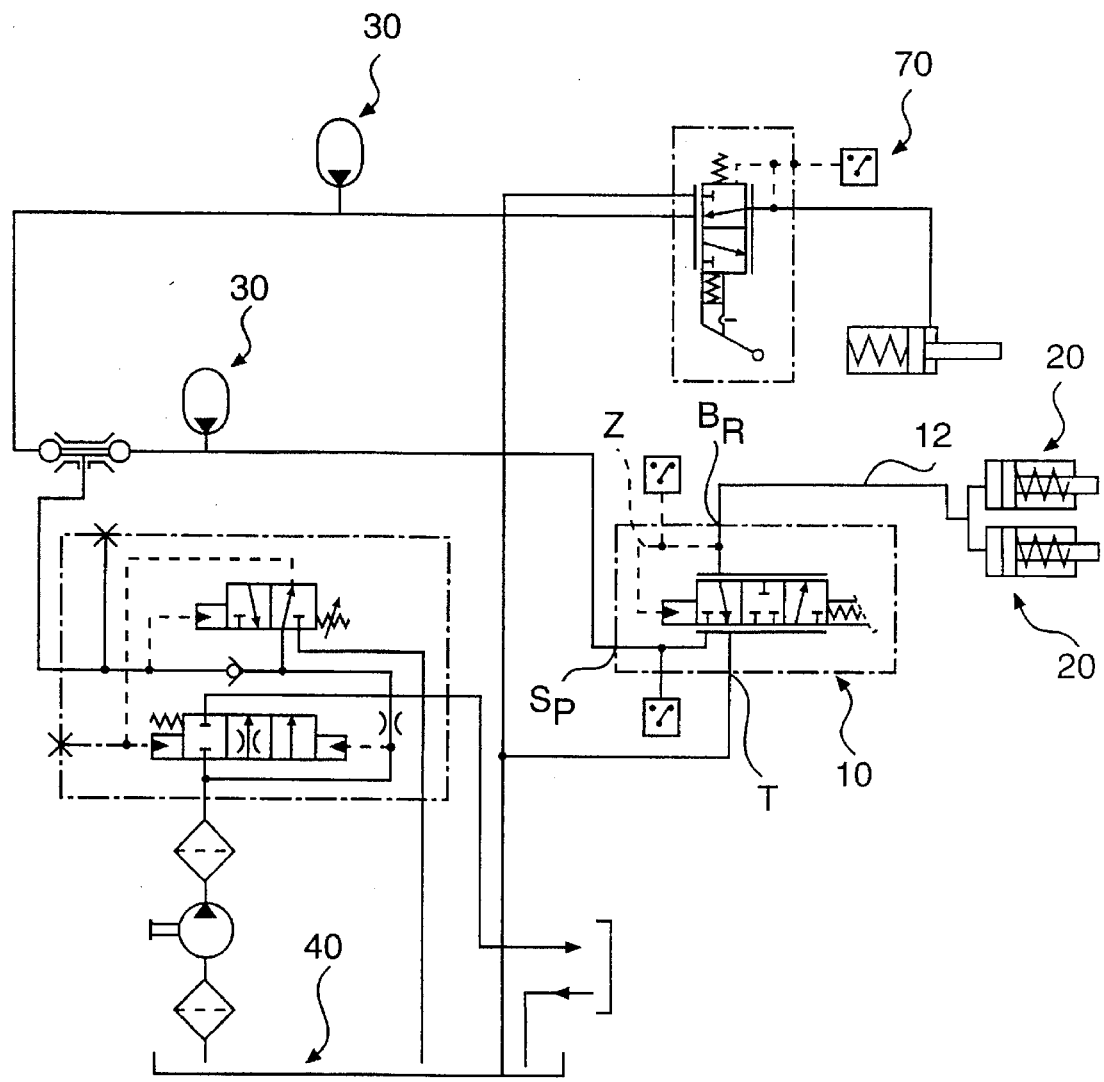
FIG. 6 shows a first known power-brake system in single-circuit embodiment with a single-circuit power-brake valve.
Figure 7:
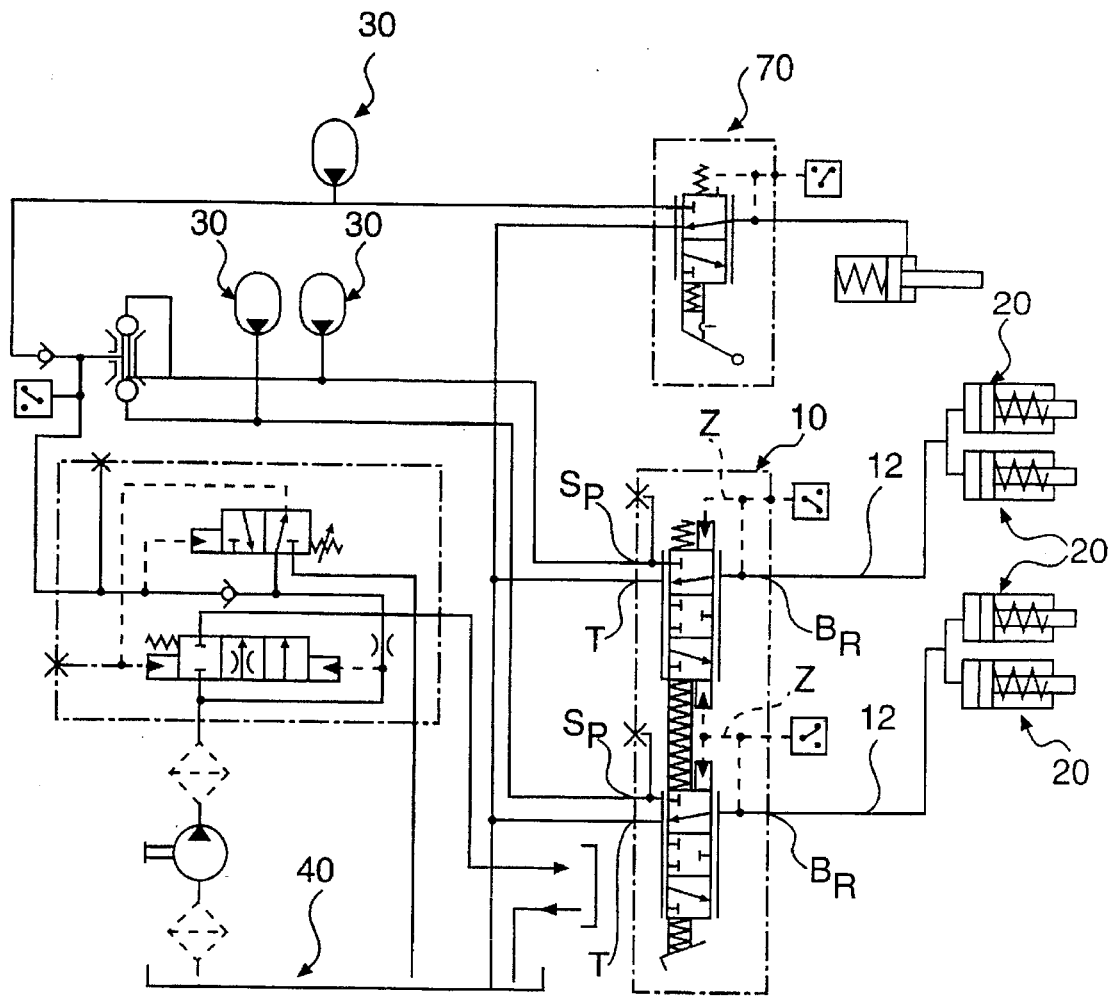
FIG. 7 shows the power-brake system of FIG. 6 as a twin-circuit brake system with a twin-circuit power-brake valve.
Figure 8:
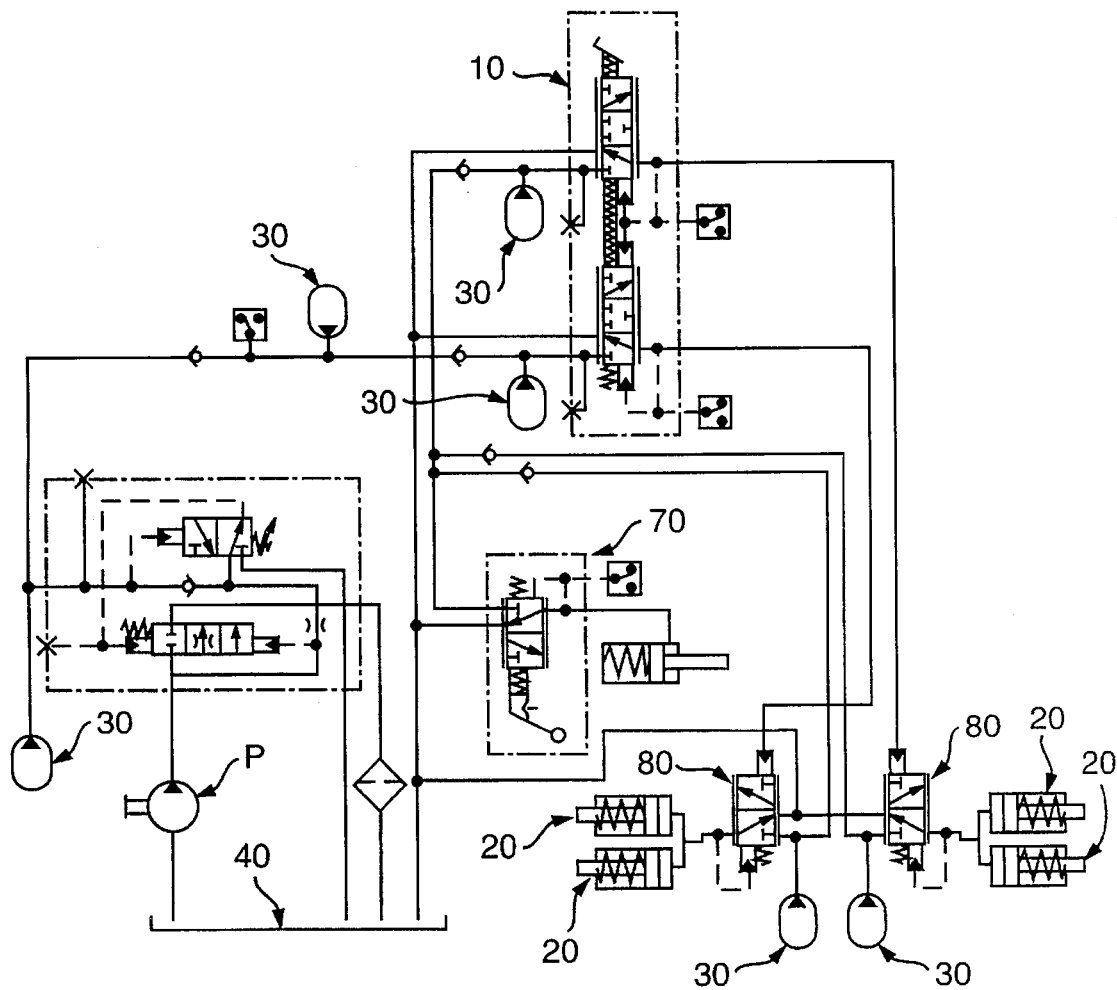
FIGS. 8 and 9 show a second known power-brake systems with twin-circuit brake system and twin-circuit power-brake valve.

FIG. 4 shows a fourth embodiment example of the invention which represents a further development of the embodiment examples previously described.

The fourth example of the power-brake valve 10 in twin-circuit embodiment, as represented in FIG. 4, shows an auxiliary pump 50 which is connected to brake conduits 12.1, 12.2 of the first and second brake circuit. A working conduit 51 is connected to auxiliary pump 50 and this conduit branches into two further working conduits 52, 53 at a point C. One of these working conduits 52 is connected to a pressure limiting valve 60, which is adjusted to a predetermined maximum pressure value, for example 2 bar, and relieves the auxiliary circuit into receiver 40 when this value is exceeded. The other working conduit 53 is connected to conduits 54.1, 54.2 which are respectively connected at a point $A_2$ to brake conduits 12.1, 12.2 of the first and second brake circuits. A non-return valve 55 is provided in each of the working conduits 54.1, 54.2 for preventing the hydraulic pressure fed to brake cylinders 20 via power-brake valve 10 and brake conduits 12.1 and 12.2 from escaping into the auxiliary circuit. The connection and construction of power-brake valve 10 and the other components correspond to that of the previous embodiment examples and do not therefore need to be described at this point. The brake pressure feedback may be achieved in any given manner corresponding to one of the three previous embodiment examples.

During operation of auxiliary pump 50 and if power-brake valve 10 is in an unloaded condition, i.e., with control plungers 13.1 and 13.2 in a neutral position, hydraulic fluid is delivered from receiver 40 through working conduits 51, 53, 54, brake conduits 12.1 and 12.2 and power-brake valve 10 into receiver 40 so that brake conduits 12.1 and 12.2, in particular, are continuously flushed. If power-brake valve 10 is then actuated, in which case only the connection between passages $B_{R1}$ and $T_1$ as well as the passage of $B_{R2}$ and $T_2$ of power-brake valve 10 is initially interrupted, a hydraulic pressure builds up in brake conduits 12.1 and 12.2 because of the output of auxiliary pump 50. This hydraulic pressure is limited in a defined manner to a maximum pressure by pressure limiting valve 60. If the control plungers 13.1 and 13.2 open the connections between the passages $S_{P1}$ and $B_{R1}$ as well as the passages between $S_{P2}$ and $B_{R2}$, brake conduits 12.1 and 12.2 are, therefore, already hydraulically preloaded so that the conduit resistance of brake conduits 12.1 and 12.2 are relatively reduced and the pressure actually acting on brake cylinders 20 is substantially held to one value over the length of brake conduits 12.1 and 12.2. For this reason, the brake pressure feedback may also be achieved in any given manner because the brake pressure instantaneously present at brake cylinders 20 may be measured to a good approximation at any given point of brake conduits 12.1 and 12.2. In addition, the pressure relayed to brake cylinder 20 via power-brake valve 10 cannot be relieved into the auxiliary system because of non-return valves 55 provided in the auxiliary circuit.

The pressure build-up times in brake cylinders 20 or in brake conduits 12.1 and 12.2 may be improved in principle by means of the fourth embodiment example, shown in FIG. 4 and according to the invention, in that a defined pressure is already generated by the auxiliary system in brake conduits 12.1 and 12.2 when power-brake valve 10 is shut off. In addition, heating of brake conduits 12.1 and 12.2 is ensured by the flushing of brake conduits 12.1 and 12.2 by the auxiliary system when the power-brake valve 10 is open in the direction of the tank 40 because hydraulic fluid heated by losses in the complete hydraulic system flushes brake conduits 12.1 and 12.2. Because of this increased operating temperature, the viscosity of the fluid located in the brake conduits then lies at an operating point which is favorable with respect to the losses so that an additional improvement to the pressure build-up times in brake conduits 12.1 and 12.2 is achieved relative to the state of the art. In addition, cooling of the brake discs (not represented) is achieved to the extent that hydraulic fluid strongly heated in brake cylinders 20 during a previous braking procedure is flushed out of brake conduits 12.1 and 12.2 into tank or receiver 40.

In a further development of the fourth embodiment example, tank heating (not represented) is provided in accordance with the invention. If the hydraulic fluid in receiver 40 is heated, brake conduits 12.1 and 12.2 flushed by the auxiliary system when power-brake valve 10 is open in the tank direction are kept at a predetermined temperature level so that cooling of brake conduits 12.1 and 12.2 during operation is prevented in a defined manner. The viscosity of the hydraulic fluid in brake conduits 12.1 and 12.2 is therefore kept at a favorable operating point in a defined manner so that, finally, the pressure losses in brake conduits 12.1 and 12.2 caused by conduit resistances are additionally minimized and a closed-loop control of control plungers 13.1 and 13.2 of power-brake valve 10 corresponding to the pressure relationships in brake cylinders 20 is additionally supported by feedback of the brake pressure.

Overall, the fourth embodiment example ensures, in further development of the previous embodiment examples, that in addition to achieving more rapid pressure build-up times and better damping relative to the state of the art, the pressure build-up times are kept constant in an advantageous manner by pressure acting on brake conduits 12.1 and 12.2 by means of the auxiliary system, independently of the actuation parameter and, therefore, oft he opening height of control plungers 13.1 and 13.2 of power-brake valve 10. In consequence, the response or feel of the brakes for the driver is always the same, whatever the desired braking effect.

Figure 9:
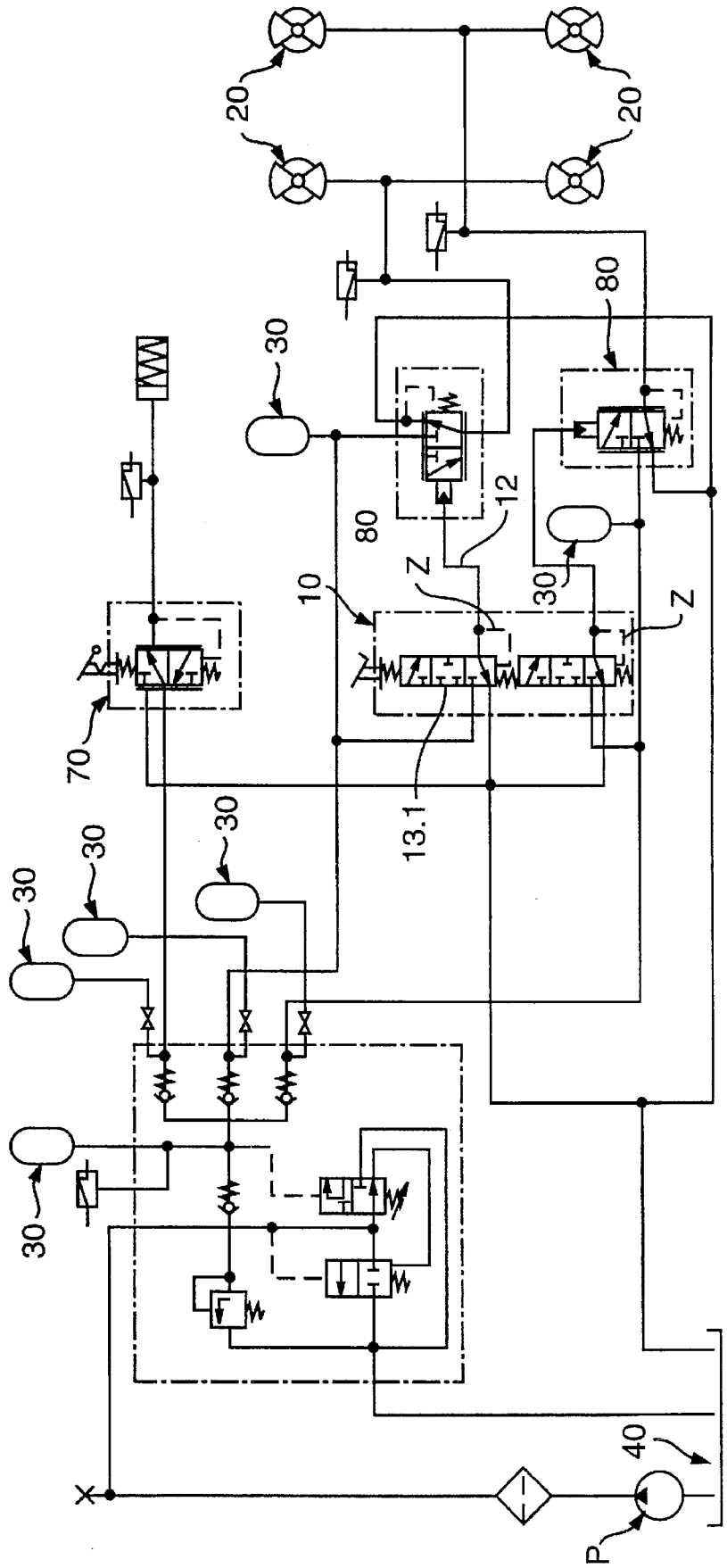

The embodiment examples described above relate to twin-circuit embodiments of power-brake valves 10 according to the invention but the control, according to the invention, of control plungers 13.1 and 13.2 may likewise be applied to single-circuit power-brake valves for the control of only one control plunger. The control according to the invention may be equally applied to a twin-circuit embodiment of power-brake valve 10 shown in FIG. 9, in which the control pressure holes $Z_1$ in valve 10, which holes $Z_1$ is connected to respective conduits 12.1 of the first brake circuit, is connected in such a way that only the first control plunger 13.1 is acted on by a control pressure proportional to the brake pressure of the first brake circuit.

In a power-brake system, a hydraulic pressure generated by means of a pump may be supplied, controllably in proportion to an actuation force and via brake conduits, by a power-brake valve to individual brake cylinders. Control pressure conduits are connected to brake cylinders or brake conduits in the vicinity of the brake cylinders and these control pressure conduits are connected to the brake valve. The brake pressure at the brake cylinders may be fed back, via the control pressure conduits, as the control pressure for acting on the control end of the brake valve so that a control of the control plungers of the brake valve is carried out corresponding to the brake pressure build-up at the brake cylinders and, particularly when low brake pressures are desired, rapid pressure build-up times in the brake conduits are ensured. In addition, throttles may be provided in the control pressure holes in the brake valve so that the damping and closed-loop control behavior of the brake valve are positively affected. In addition, the brake conduits may be flushed from the direction of the brake cylinders by means of an auxiliary pump.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims, unless they depart therefrom.

We claim:

1. A method for controlling a power-brake system with closed-loop adjustment, said method comprising the steps of:

providing an at least one circuit power-brake valve having at least one control plunger integrally;

providing at least one brake cylinder operatively connected to said at least one control plunger through a brake conduit;

preloading said at least one control plunger into an initial position by springs which act on a control end of said control plunger;

applying an actuating force onto an actuating end of said at least one control plunger, said step of applying said actuating force including communicating said actuating force to said at least one brake cylinder through said brake conduit, and generating a brake pressure through said at least one brake cylinder: and generating a control pressure on said at least one control plunger so as to adjust said brake pressure at said at least one brake cylinder in proportion to said actuation force from said actuating end of said at least one control plunger, said step of generating said control pressure including providing a control pressure conduit connected to said brake conduit at an immediate vicinity of said at least one brake cylinder and to said control end of said at least one control plunger, and feeding back said brake pressure generated at said brake cylinders via said external control pressure conduit to said control end of said at least one control plunger, as said control pressure acting against said actuation force, whereby said control pressure at said control end of said at least one control plunger is proportional to said brake pressure generated at said at least one brake cylinder.

2. A power-brake valve in a power brake system for closed-loop regulation of brake pressure in a plurality of brake cylinders, said power brake system comprising:

at least one brake cylinder;

at least one brake fluid reservoir;

at least one control plunger having means for preloading said control plunger in a neutral position, an actuating end with means for inputting an actuating force in order to change said control plunger into a control position and thereby generate a braking pressure transmitted through said control plunger and said brake conduit to said at least one brake cylinder, and a control end with means for inputting a control pressure on said control plunger in order to adjust said brake pressure at said at least one brake cylinder in proportion to said actuating force;

a brake conduit operatively connected between said control plunger and said at least one brake cylinder so as to transmit said braking pressure through said control plunger and said brake conduit to said at least one brake cylinder; and at least one external control pressure conduit operatively connected between said brake conduit at an immediate vicinity of said brake cylinder and said control pressure inputting means, wherein said brake pressure at said at least one brake cylinder is fed back through said at least one control pressure conduit to said control pressure inputting means.

3. The power-brake valve according to claim 2 further comprising: control pressure means for connecting said external control pressure conduit to said control pressure inputting means.

4. The power-brake valve according to claim 3 wherein said control pressure means includes a throttle orifice defined inside said valve.

5. The power-brake valve according to claim 3 or 4 wherein said valve further includes a brake passage that connects said control plunger to said brake conduit, wherein a throttle orifice defined in said valve is further defined to be operatively connected between said control pressure inputting means and said brake fluid passage.

6. The power-brake valve according to claim 4, wherein said throttle orifice defined in said valve is further defined to be operatively connected between said control pressure inputting means and said external control pressure conduit through said control pressure hole.

7. The power-brake valve, according to claim 2, further comprising an auxiliary pump connected to said brake conduit, said auxiliary pump including means for flushing said brake conduit when said control plunger is in said neutral position and means for hydraulically generating preloading pressure into said brake conduit when said at least one brake cylinder is acted on by said braking pressure.

8. The power-brake valve according to claim 7, further comprising a non-return valve disposed in a connection conduit connecting said auxiliary pump to said brake conduit, wherein said non-return valve maintains said preloading pressure in said brake conduit when said brake cylinder is acted on by said braking pressure.

9. The power-brake valve according to claim 7, further comprising a pressure limiting valve connected to said flushing means of said auxiliary pump for adjusting flushing flow in said brake conduit according to a predetermined value.

10. A power-brake valve device in a power brake system for regulating a brake pressure in a plurality of brake cylinders, said device comprising:

a valve;

at least one control plunger in said valve;

at least one brake cylinder in fluid communication with said control plunger;

a reservoir in fluid communication with said control plunger, said control plunger being positioned to communicatively connect said reservoir to said brake cylinder;

a brake conduit communicatively connecting said control plunger to an input end of said brake cylinder; and a control pressure conduit for feeding back control pressure to said control plunger from said brake conduit, said control pressure conduit being external to said valve and having a first end connected to said control plunger through said valve and a second end connected to said brake conduit at an immediate vicinity of said at least one brake cylinder, wherein said control plunger is preloaded in a neutral position, and includes means for applying an actuating force onto said control plunger so as to shift said control plunger into a brake pressure generating position and means for adjusting said control plunger in said brake pressure generating position, said adjusting means being operatively connected to said first end of said control pressure conduit so as to receive said control pressure and apply said control pressure to said control plunger.

* * * * *